United States Patent
Bershteyn et al.

(10) Patent No.: US 12,437,134 B2
(45) Date of Patent: Oct. 7, 2025

(54) DETERMINISTIC NETLIST TRANSFORMATIONS IN A MULTI-PROCESSOR PARALLEL COMPUTING SYSTEM

(71) Applicant: Synopsys, Inc., Mountain View, CA (US)

(72) Inventors: Mikhail Bershteyn, Forest Hills, NY (US); Olivier Rene Coudert, Sunnyvale, CA (US); Florent Sébastien Marc Emmanuel Claude Duru, Shrewsbury, MA (US)

(73) Assignee: Synopsys, Inc., Sunnyvale, CA (US)

( * ) Notice: Subject to any disclaimer, the term of this patent is extended or adjusted under 35 U.S.C. 154(b) by 699 days.

(21) Appl. No.: 17/751,253

(22) Filed: May 23, 2022

(65) Prior Publication Data

US 2022/0391568 A1    Dec. 8, 2022

Related U.S. Application Data

(60) Provisional application No. 63/208,431, filed on Jun. 8, 2021.

(51) Int. Cl.
    *G06F 30/30*     (2020.01)
    *G06F 30/323*    (2020.01)
    *G06F 30/327*    (2020.01)
    *G06F 30/337*    (2020.01)

(52) U.S. Cl.
    CPC .......... *G06F 30/337* (2020.01); *G06F 30/323* (2020.01); *G06F 30/327* (2020.01)

(58) Field of Classification Search
    None
    See application file for complete search history.

(56) References Cited

U.S. PATENT DOCUMENTS

| | | | |
|---|---|---|---|
| 7,958,468 B2 * | 6/2011 | Meserve | G06F 30/30 716/129 |
| 8,516,418 B2 * | 8/2013 | Singh | G06F 30/394 716/54 |

(Continued)

OTHER PUBLICATIONS

L. Wang et al., "How to Partition a Billion-Node Graph," ICDE Conference 2014, IEEE, pp. 568-579. (Year: 2014).*

(Continued)

*Primary Examiner* — Leigh M Garbowski
(74) *Attorney, Agent, or Firm* — Fenwick & West LLP

(57) ABSTRACT

A system obtains deterministic results of netlist transformation in a multi-processor parallel computing system. The system receives a netlist. The system determines a set of components representing components with assigned identifiers. The system determines identifiers for remaining components. The system visits a component of the remaining components of the netlist in a topological order starting from the set of components. The system assigns a new identifier to the visited component. The new identifier is generated based on properties of the visited component and a connection of the visited component with at least one component of the set of components. Once the component is assigned an identifier, the system adds the component to the set of components. The system repeats these steps to assign an identifier to remaining components that are not included in the set.

20 Claims, 11 Drawing Sheets

(56) References Cited

U.S. PATENT DOCUMENTS

| | | | | |
|---|---|---|---|---|
| 8,667,436 | B1* | 3/2014 | Garlapati | G06F 30/3308 |
| | | | | 716/136 |
| 10,657,306 | B1* | 5/2020 | Ma | G06F 30/327 |
| 10,789,403 | B1* | 9/2020 | Dureja | G06F 17/16 |
| 11,144,700 | B1* | 10/2021 | Wang | G06F 30/347 |
| 11,475,197 | B2* | 10/2022 | Coudert | G06F 30/33 |
| 2019/0311535 | A1* | 10/2019 | Lacey | G06T 17/20 |

OTHER PUBLICATIONS

Maleki, S. et al. "BiPart: A Parallel and Deterministic Hypergraph Partitioner." PPoPP '21: Proceedings of the 26th ACM SIGPLAN Symposium on Principles and Practice of Parallel Programming, Feb. 2021, pp. 161-174.

PCT International Search Report and Written Opinion, PCT Application No. PCT/US2022/031159, Sep. 26, 2022, 16 pages.

Zhang, W. et al. "LSH-Based Graph Partitioning Algorithm." International Conference on Artificial Intelligence, vol. 888, Aug. 2, 2018, pp. 55-68.

* cited by examiner

DETERMINISTIC NETLIST TRANSFORMATIONS IN A MULTI-PROCESSOR PARALLEL COMPUTING SYSTEM

CROSS REFERENCE TO RELATED APPLICATIONS

This application claims a benefit of U.S. Patent Application Ser. No. 63/208,431, filed Jun. 8, 2021, the contents of which are incorporated by reference herein in its entirety.

TECHNICAL FIELD

The present disclosure relates to parallel processing of electronic circuit designs in general, and more specifically to obtaining deterministic results of netlist transformations in a multi-processor parallel computing system.

BACKGROUND

A circuit design is represented as a netlist of components connected via nets. Several circuit design processes rely on the order of components in the netlist of the circuit design, for example, logic emulation in a field programmable gate array (FPGA). Components of the netlist are assigned indexes to specify an order which is used for subsequent processing related to circuit design and verification. Due to an increase in a number of components in circuit designs, circuit designs are typically processed using multiple processors. When netlists are processed using multiple processors, ensuring deterministic assignment of new unique indices becomes challenging. With parallel processing, the assignment of new unique indices can be non-deterministic and can produce different results with different executions. Such results may not be useful for circuit design processes that rely on the values of the assigned indices. Deterministic indexing of components can be obtained using processor synchronization. However, processor synchronization incurs a substantial performance penalty and makes the netlist transformation non-scalable with an increasing number of processors.

SUMMARY

A system according to various embodiments obtains deterministic results of netlist transformation in a multi-processor parallel computing system. The system receives a netlist comprising a set of components and connections between components of a circuit design. The set of components represents components with assigned identifiers. The system determines identifiers for remaining components of the netlist as follows. The system visits a component of the remaining components of the netlist in a topological order starting from the set of components such that all components visited before the component have the assigned identifiers and are included in the set of components. The system assigns a new identifier to the visited component. The new identifier is generated based on properties of the visited component and a connection of the visited component with at least one component of the set of components. Once the component is assigned an identifier, the system adds the component to the set of components. The system repeats these steps to assign an identifier to remaining components that are not included in the set.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

The system according to various embodiments establishes deterministic component indexing while performing parallel transformations of the netlist. These indices are assigned before executing design procedures that are order sensitive. Examples of such procedures include partitioning of netlist by assigning the netlist components to non-overlapping partitions that satisfy certain criteria relevant to the application, for example, a maximum group size, and a number of connections between the groups. Such procedures rely on a deterministic component indexing and produce unpredictable results with non-deterministic component indexing. The system according to various embodiments performs deterministic component indexing using multiple processors. An index assigned to a component may also be referred to as an identifier.

The techniques disclosed may be used for procedures that modify the netlist, for example, by adding components to the netlist. Circuit design procedures can modify netlists by performing transformations such as, constant propagation, buffer/invertor optimization, logic refactoring, clock circuit simplification, partitioning, and logic replication. The system and procedures according to various embodiments allow component indexing in parallel for such applications.

Figure 1:
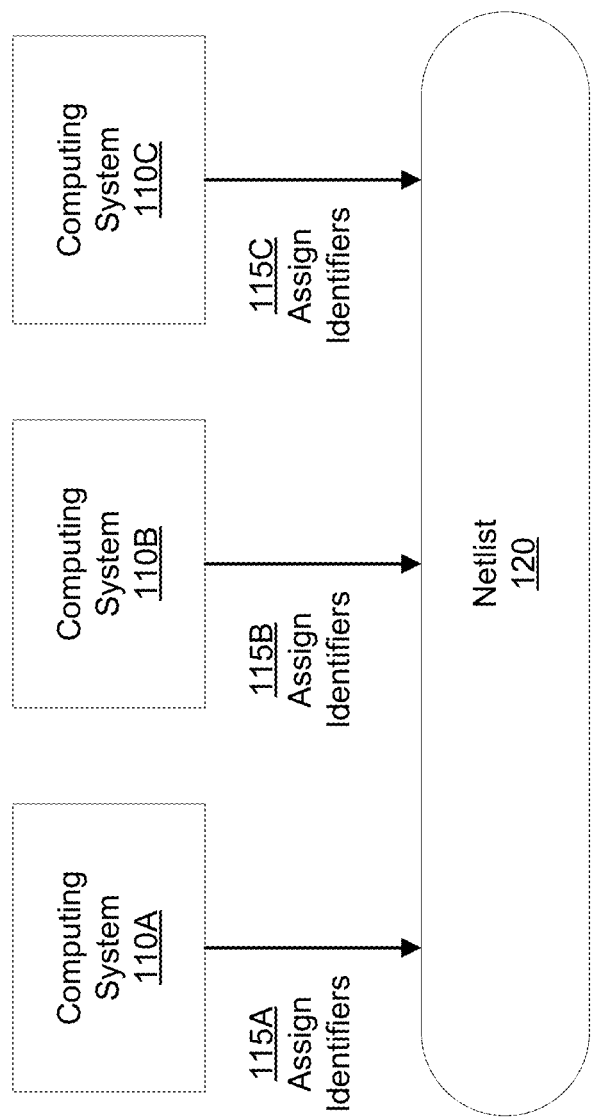
FIG. 1 illustrates the overall system environment for processing a netlist using multi-processors, according to an embodiment.

Figure (FIG. 1 illustrates the overall system environment for processing a netlist using multi-processors, according to an embodiment. FIG. 1 shows multiple computing systems 110A, 110B, 110C processing a netlist 120. In some embodiments, a single computing system 110 may execute multiple processes or threads that execute concurrently for processing different portions of the netlist. Each computing system 110A, 110B, 110C performs corresponding steps 115A, 115B, 115C to assign identifiers to components of the netlist.

Figure 2:
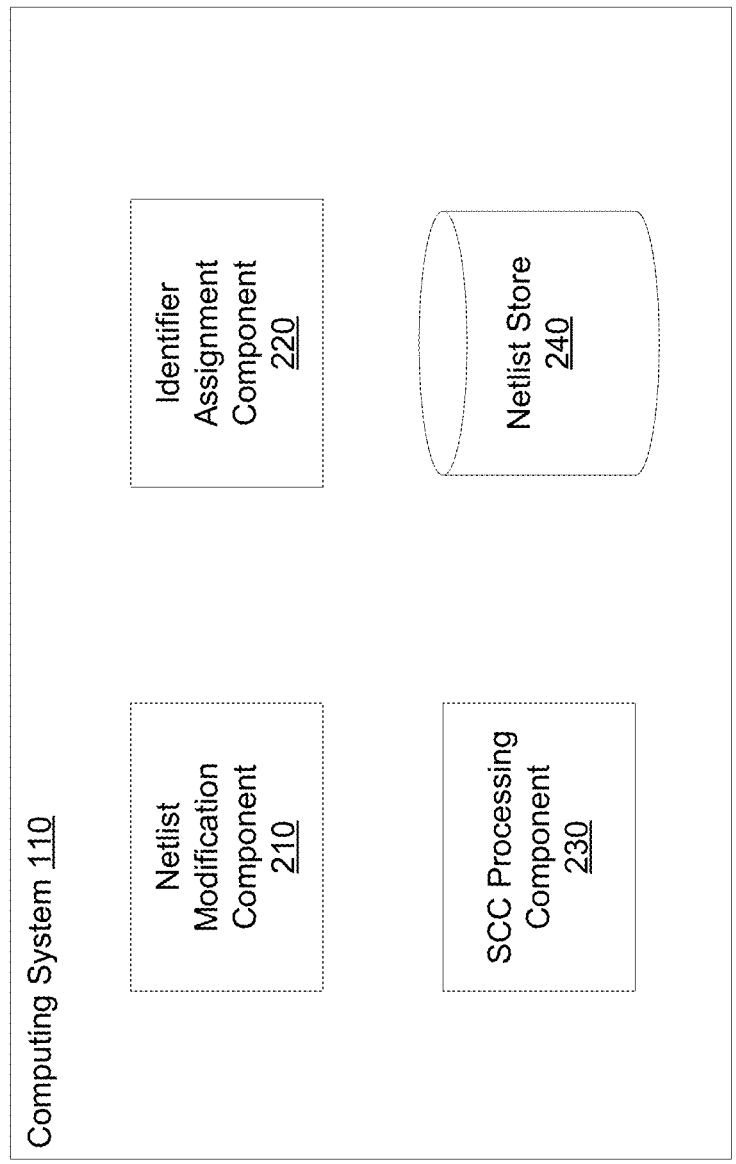
FIG. 2 is a block diagram of a system architecture of a computing system for assigning identifiers to components of a netlist, according to an embodiment.

FIG. 2 is a block diagram of a system architecture of a computing system for assigning identifiers to components of a netlist, according to an embodiment. The computing system 110 includes a netlist modification component 210, an identifier assignment component 220, an SCC (strongly connected component) processing component 230, and a netlist store 240. The components of the computing system 110 are implemented by one or more processing devices (also referred to as computer processors), for example, the processing device shown in FIG. 11.

The netlist store 240 may store a portion of the netlist being processed or the complete netlist being processed. The netlist may be represented as a graph including a set of nodes representing uniquely indexed components and a set of edges representing connections between various ports of such components. A logic gate is a netlist component that produces an output value determined by a Boolean function of input values. A flip/flop is a netlist component capable of storing a bit of information permanently and overwrite it only upon arrival of predetermined value change (known as edge) on one of its inputs. A latch is a netlist component capable of storing a bit of information permanently and overwrite it only upon arrival of predetermined value on one of its inputs. Ports are a generalized term encompassing all inputs and outputs of a netlist component.

The netlist modification component 210, processes a netlist N1 to obtain a modified netlist N2. The modified netlist N2 may have a different set of components compared to the previous netlist N1 that was processed. For example, in the process of netlist transformation, existing components of netlist N1 may be eliminated, and new components created and added to the modified netlist N2.

The identifier assignment component 220, assigns unique indices to the new components added to the modified netlist N2. Accordingly, the previous netlist N1 may have assigned identifiers to all components of the previous netlist N1. When the computing systems 110 modify the previous netlist N1 to obtain the modified netlist N2, the modified netlist N2 has previously assigned identifiers to all components that are common with the netlist N1. However, the modified netlist may include new components. The computing systems 110 assigns identifiers to the components that were added to the modified netlist N2.

Processing of loops requires additional handling by the system. The system identifies loops by identifying strongly connected components (SCCs). The SCC processing component 230 identifies strongly connected components in the graph represented by the netlist. The computing system 110 processes SCCs as described in the process illustrated in FIG. 7.

Figure 3:
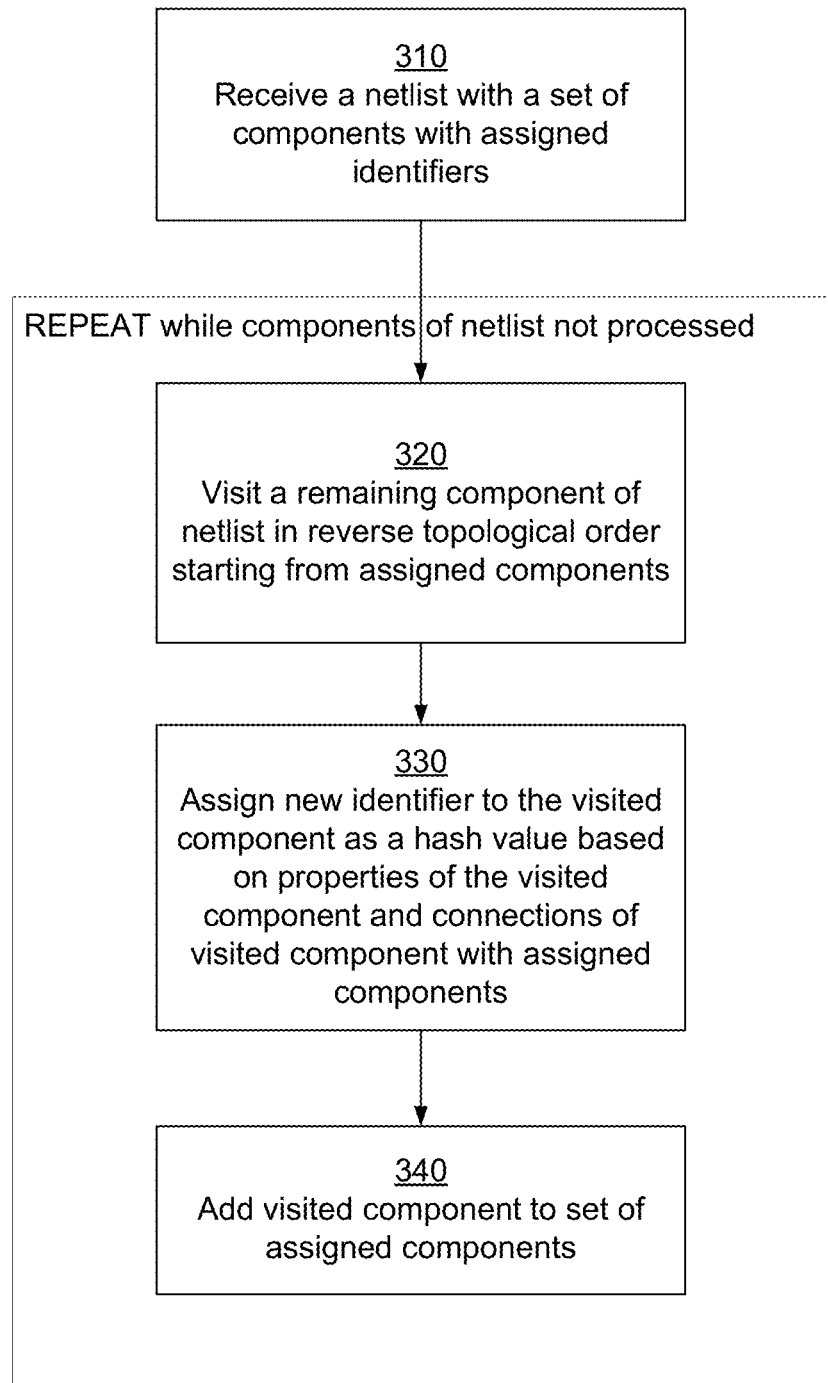
FIG. 3 illustrates a process for assigning identifiers to components of a netlist using reverse topological order hash computation, according to an embodiment.

FIG. 3 illustrates a process for assigning identifiers to components of a netlist using reverse topological order hash computation, according to an embodiment. The steps are described as being performed by a system, for example, the computing system 110.

The system performs the step of receiving 310 a netlist having a set S1 of components that have previously assigned identifiers. For example, a set S2 of new components may be added to a netlist that has a set S1 of components. A component with an assigned identifier is also referred to as an assigned component.

The system repeats the steps 320, 330, and 340 while there are components of the netlist that are not processed, i.e., components that have not been assigned an identifier yet. The system performs the step 320 of visiting a remaining component of the netlist that does not have an assigned identifier. The remaining components belong to the set S2 of components without assigned identifiers. The system visits the remaining components in a topological order starting from components belonging to the set S1 of assigned components. In an embodiment, the system visits the remaining components in a reverse topological order starting from components belonging to the set S1 of assigned components.

The system performs the step 330 of assigning a new identifier to the visited component. According to an embodiment, the system uses unique identifiers generated in the order (ascending or descending) of hash values produced using a hash function that is an integer function such that its value belongs to a given integer interval [0, V]. Accordingly, the hash values provide the order of the new indices. Using indices that are generated in the order of the hash values rather than using the hash values themselves as indices results in generating a more compact set of deterministic indices rather than a set with unused indices within. The value of the hash function is uniquely determined by the arguments of the hash function and the order of the arguments. The probability of obtaining the same value of hash function with different sets of arguments is inversely proportionate to the size of the interval V. The hash value is a result of executing hash function with a given set of arguments.

A topological ordering of components in a netlist is an ordering in which any component occurs after the components connected to its inputs. Reverse topological ordering of components in a netlist is an ordering in which any component occurs after the components connected to its outputs. The system performs the step 340 of adding the visited component to the set S1 of assigned components since the visited component has an assigned identifier.

Figure 4:
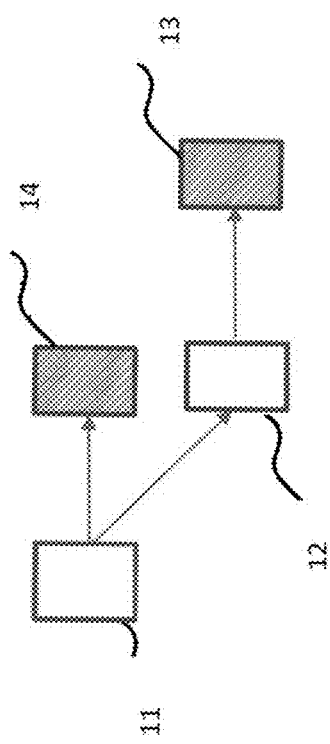
FIG. 4 illustrates an example netlist produced by a series of parallel transformations, according to an embodiment.

FIG. 4 illustrates an example netlist produced by a series of parallel transformations, according to an embodiment. Boxes 13 and 14 shown filled with striped pattern represent netlist components that retain their original deterministic indices. Boxes 11 and 12 shown without fill represent components newly created during parallel netlist transformation. It is further appreciated that similarly in FIG. 6 and FIG. 8, boxes shown filled with striped pattern represent netlist components that retain their original deterministic indices, while boxes shown without fill represent components newly created during parallel netlist transformation.

To establish a deterministic ordering of components shown in FIG. 4, each component is assigned a structural hash value. The hash value depends upon various factors including (1) indices of components that retain deterministic positions that were not changed by the transformations, (2) connections between components, and (3) properties of components including, but not limited to, (a) types of components, for example, a logic gate, a register, and a latch, (b) a logical operation performed by the components, for example, Boolean functions such as "and", and "or", and (c) sets of ports including input ports and output ports.

The system generates an identifier using hash functions as follows. The system computes a function AH(v0, ..., vn) known as an array hash function, which takes an arbitrary number n of integers v0, ..., vn, and produces a hash value in a given range. The hash value produced by the function AH is uniquely determined by the values of the integer arguments of the function AH and their order. Second, a function CH(component), which takes a component as argument and produces a hash value in a given range. The value produced by the CH function for a component is uniquely determined by special properties of the component, including but not limited to: (1) the component's type, for example, logic gate, register, latch, etc. (2) a Boolean function represented by the component if applicable, for example, "and", and "or", and (3) the set of ports of the component.

The system computes a component hash function using the array hash function and numerical representations of characteristics of the components. For example, component type may be represented by an integer value (e.g., 1 for logic gate, 2 for register) and used in the first position of hashed array. Boolean function can be represented as a truth table and used in the second position.

The range of hash values used is determined so as to maximize the speed of hash computation while minimizing the probability of hash collision. For example, if the system uses a 64-bit hash value then the probability of two uniformly distributed random numbers assuming the same value is equal to $\frac{1}{2}^{64}$. If such probability is deemed high (e.g., greater than a threshold), a larger range (e.g., 128-bit) may be used.

The computation of the identifiers of components is illustrated using the example netlist shown in FIG. 4. First, the system assigns hash value H[i]=AH(i) to all components that deterministically retain their original positions I, for example, components 13 and 14 in FIG. 4. Next, the system visits every remaining component in reverse topological order such that a component is visited only when all downstream components have been assigned hash value. In the diagram shown in FIG. 4, first component 12 is visited and finally component 11 is visited. For each such component, the system computes hash value using hash values of its downstream components and port numbers of such components to which a given component is connected. Component 12 is connected to port #1 of component 13, therefore its hash value is determined as H[12]=AH(CH(12), H[13], 1). Component 11 is connected to port #1 of component 12 and port #1 of component 14. Since component 11 comes after component 12 in reverse topological order, the system computes H[11]=AH(CH(11), H[12], 1, H[14], 1).

In netlists generated by certain applications, for example, in an emulation netlist, every component has a single driver. Therefore, any two components have their hash values computed from a unique set of arguments. Hash collision, therefore, can only occur with a probability determined by the range of hash values as described above. In other applications that process circuit designs, a component may have multiple outputs. If a component has multiple outputs, the system computes a distinct hash value for each output. The hash value of the component itself may be determined using the hash values of all the outputs of the component.

Figure 5:
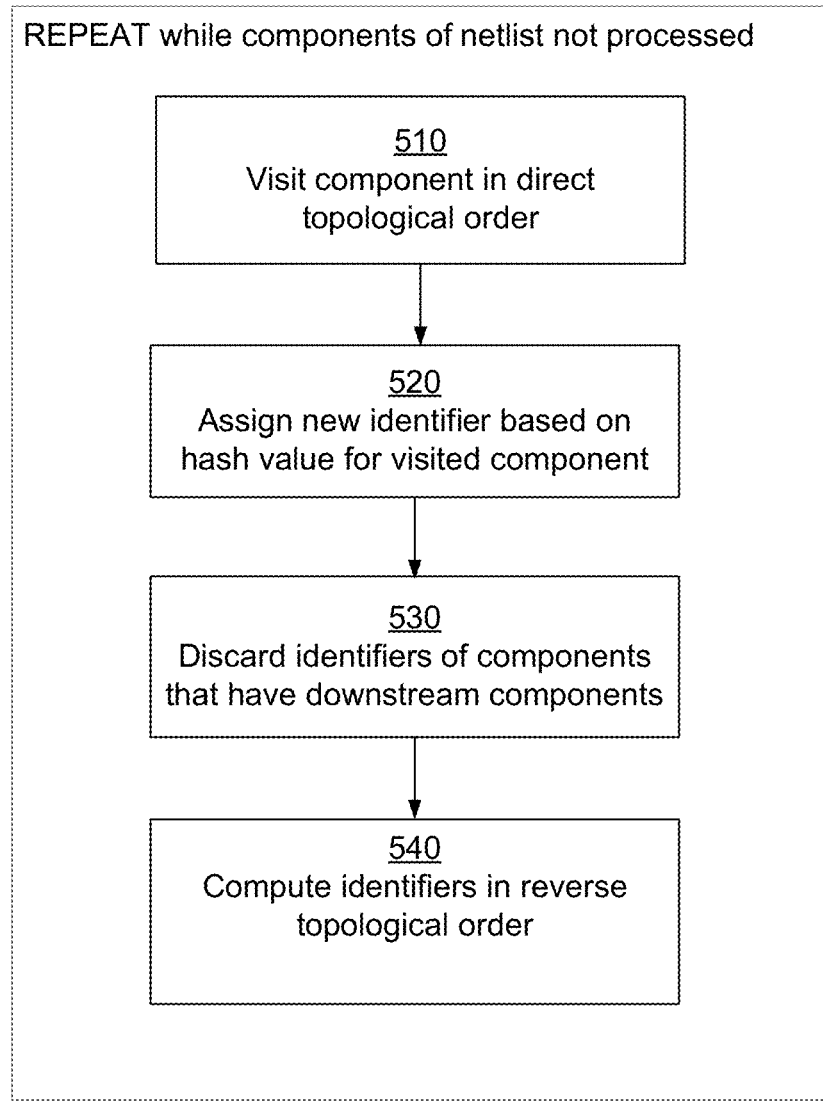
FIG. 5 illustrates a process for assigning identifiers to components of a netlist using direct topological order hash computation, according to another embodiment.

If the system identifies components that have not been assigned identifiers at the end of the reverse topological order traversal, the system assigns identifiers to remaining components by performing a direct topological traversal from the set of components. FIG. 5 illustrates a process for assigning identifiers to components of a netlist based on a direct topological order, according to another embodiment. The process shown in FIG. 5 is illustrated using FIG. 6 that illustrates an example netlist produced by a series of parallel transformations, according to another embodiment.

Figure 6:
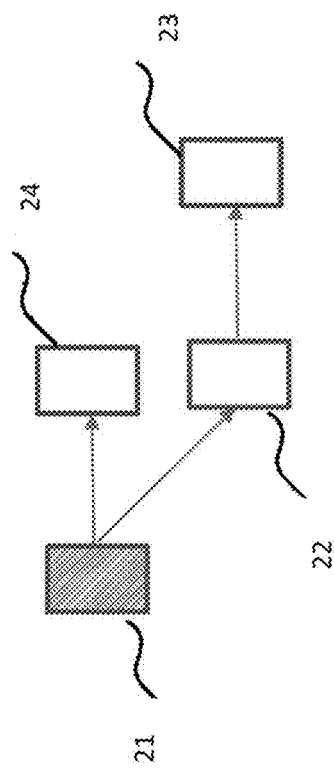
FIG. 6 illustrates an example netlist produced by a series of parallel transformations, according to another embodiment.

The system performs step 510 by visiting every remaining component in direct topological order such that a component is visited only when all upstream components have been assigned a hash value. FIG. 6 shows component 21 that deterministically retained its original index, and newly created components 22, 23, 24. In this case, components 22, 23, and 24 do not have any deterministically indexed components downstream, so the procedure outlined above is not applicable. Such a situation may be possible, and the system accounts for it as follows.

The system performs the step 520 of assigning new identifiers based on hash value for the visited component. Accordingly, the system first assigns hash value H[i]=AH(i) to all components that deterministically retain their original positions, for example, component 21 of FIG. 6. In FIG. 6, the system first visits components 22 and 24, and finally visits component 23. For each such component, the system computes a hash value using hash values of its upstream components and port numbers of the given component to which such upstream components are connected. For example, if component 22 is connected to component 21 through port #1, its hash value is determined as H[22]=AH(CH(22), H[21], 1). Similarly, if component 24 is connected to component 21 through port #1, its hash value is determined as H[24]=AH(CH(24), H[21], 1). Similarly, if component 23 is connected to component 22 through its port #1, its hash value is determined as H[23]=AH(CH(23), H[22], 1).

The system performs the step 530 of discarding hash values of all components that do not retain their original index (e.g., from the previous netlist) and that have any downstream components. In FIG. 6 this is component 22, because component 21 has an original deterministic index and components 23 and 24 have no downstream connections. As a result, H[21], H[23], and H[24] are known and unique and H[22] is unknown and needs to be computed. Next, the system uses the first procedure of reverse topological order visitation to compute 540 remaining hash values. Specifically, H[22]=AH(CH(22), H[23], 1).

As a result, all components obtain hash values that are deterministic and unique unless low probability collision or random values occur. If two components are of the same type and structure, their component hash values are identical. For example, if components 22 and 24 are of the same nature, for example, both are logic gates implementing same Boolean function, then CH(22) is equal to CH(24). Therefore, H[22] is equal to H[24], which represents a collision. For example, if component 22 did not exist, components 23 and 24 may get assigned the same hash value if their internal properties were identical. However, in such case components 23 and 24 would have been indistinguishable for any useful purpose, and the order of their indices would not be material for any subsequent netlist transformation.

Figure 7:
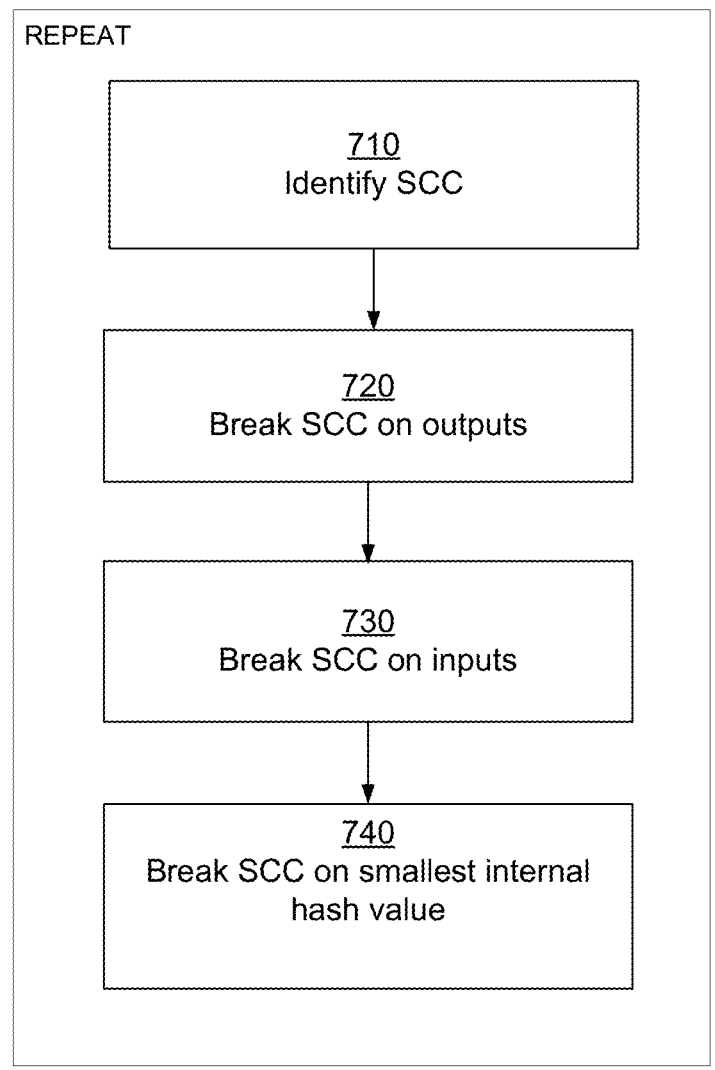
FIG. 7 illustrates a process for handling strongly connected components while assigning identifiers to components of a netlist, according to another embodiment.

Some netlists may include loops that require additional processing for assigning identifiers. To handle loops, the system identifies strongly connected components and processes them as follows. A strongly connected component is a set of nodes of a graph such that each node is reachable from any other node within the set. FIG. 7 illustrates a process for handling strongly connected components while assigning identifiers to components of a netlist, according to another embodiment. The process shown in FIG. 7 is illustrated using the example netlist shown in FIG. 8.

The process illustrated in FIG. 7 is used to establish deterministic topological order in a group of strongly connected components (SCC) that are newly created and do not have an initial deterministic index. The system establishes a topological order for a group of strongly connected components by identifying a component output that leads to components that have deterministic indices and ignoring a connection from this output to any other components in the group of strongly connected components. Ignoring a connection from an SCC may cause the corresponding set of components to lose the property of being strongly connected since that set of components does not satisfy the properties of an SCC anymore. The connection is simply removed from consideration in determining topological order but is retained for other processing based on the netlist. This is so because not all components can be reached from every other component within the set after removing the connection. This step is referred to as breaking the SCC by removing a connection. The system further establishes topological order for groups of strongly connected components by identifying a component input that leads to components that retain deterministic indices and ignoring a connection from other inputs of this component to any other components in the SCC.

Figure 8:
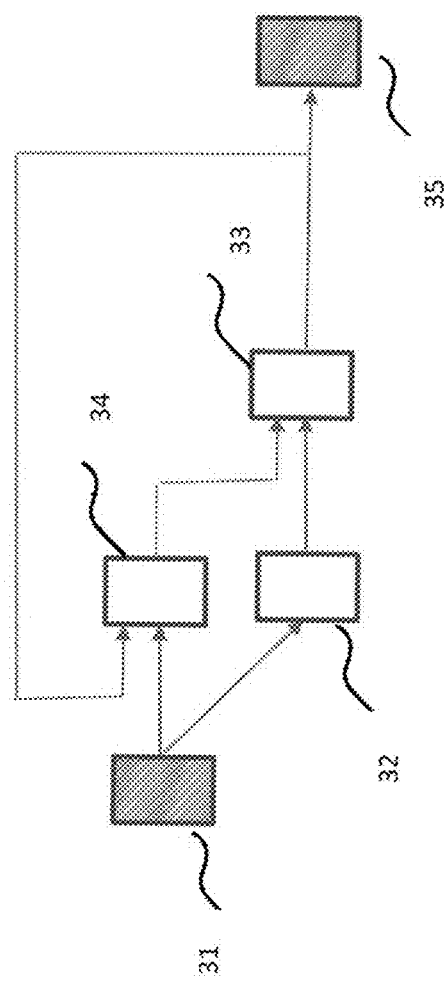
FIG. 8 illustrates an example netlist illustrating processing of strongly connected components, according to another embodiment.

FIG. 8 illustrates an example netlist illustrating processing of SCCs, according to another embodiment. FIG. 8 shows components 31 and 35 that deterministically retain their original indices, and newly created components 32, 33, 34. Each of the components 32, 33, 34 has deterministically indexed component 35 downstream, so the procedure of reverse topological order hash computation is applicable. They also have component 31 upstream so the procedure of direct topological order hash computation is also applicable. However, components 33 and 34 are strongly connected since each is reachable from the other (i.e., an output of component 33 is fed to an input of component 34, and an output of component 34 is fed to an input of component 33), and topological ordering between them cannot be uniquely established. Depending on how the topological order is established between components 33 and 34, the resulting hash values may be different for components 32, 33, and 34. The system establishes such order deterministically and independent of their temporary indices as follows.

The system identifies 710 an SCC in the netlist. The system determines the inputs and outputs of the SCC. The input of the SCC is an input port of a component that belongs to the SCC while this input port is connected to a component that does not belong to the SCC. The output of the SCC is an output port of a component that belongs to the SCC while this output port is also connected to a component that does not belong to the SCC. In the diagram in FIG. 8, the SCC includes components 33 and 34. This SCC has one output that goes from component 33 to component 35 and two inputs, one that goes from component 31 to component 34, and one that goes from component 32 to component 33.

Next, the system identifies outputs that have downstream components with deterministic indices. In FIG. 8, this is an output leading to component 35. If there are several such outputs, the system selects an output that connects a component with the lowest deterministic index. The system performs step 720 that breaks the SCC by removing a connection from this output to components inside the SCC from consideration in determining a topological order. If several outputs lead to the same component of the smallest deterministic index, the system removes all of them. In FIG. 8, the connection from 33 to 34 will be removed. If this establishes a topological order the procedure is completed, for example, if these steps are executed on the netlist of FIG. 8, the procedure will be complete since a topological order is established. The system identifies a new SCC and repeats from step 710. If there are no more outputs that lead to a component with deterministic index, the system proceeds to step 730.

Continuing, the system identifies inputs to the SCC that have at least one upstream component with a deterministic index. In FIG. 8, this will be a connection from 32 to 33 and a connection from 31 to 34. The system selects an input that leads to a component with the lowest deterministic index. The system performs step 730 that breaks the SCC by removing connections from input component to components inside SCC from consideration in determining a topological order. If several inputs lead to the same component of the smallest deterministic index, the system removes all of them. In FIG. 8, connections from 33 to 34 and from 34 to 33 will both be removed. If this establishes a topological order, for example, as shown in FIG. 8, the procedure is completed. Otherwise, the system determines a new SCC and repeats from step 710. If there are no more inputs that lead to a component with deterministic index, the system proceeds to step 740.

Next, the system processes the case of an SCC that has no inputs or outputs that lead to components with deterministic indices. The system performs step 740 that breaks the SCC on the component with the smallest internal hash value. Accordingly, the system computes CH(i) for all components of SCC. The system identifies the components(s) with the smallest value of CH(i). For all of them, the system removes connections from their inputs to components inside SCC from consideration in determining topological order.

These steps allow a topological order to be established in a netlist with loops. Accordingly, the system is able to deterministically assign indexes to the components of the netlist using multiple processors.

Figure 9:
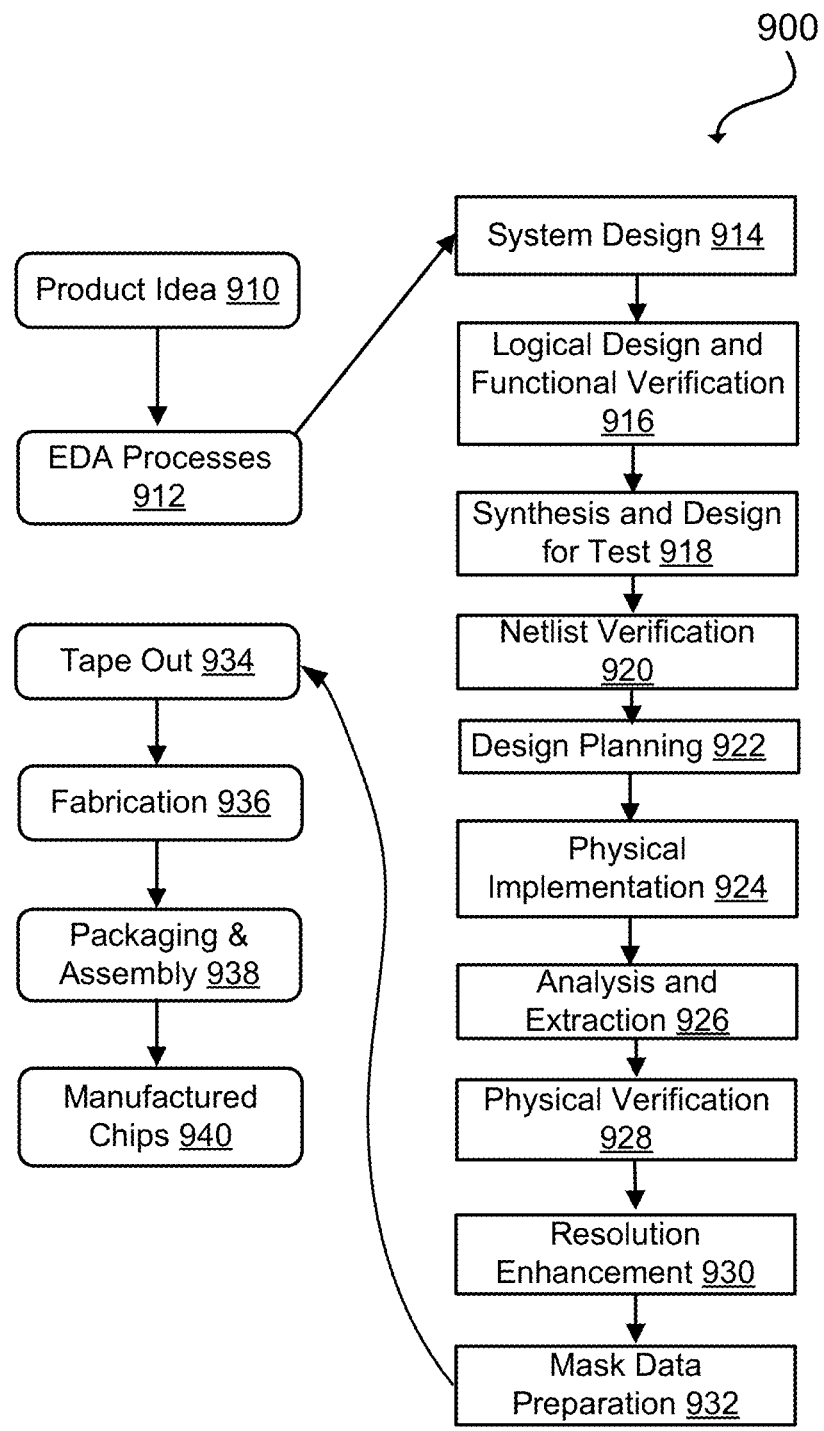
FIG. 9 depicts a flowchart of various processes used during the design and manufacture of an integrated circuit in accordance with some embodiments.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 10:
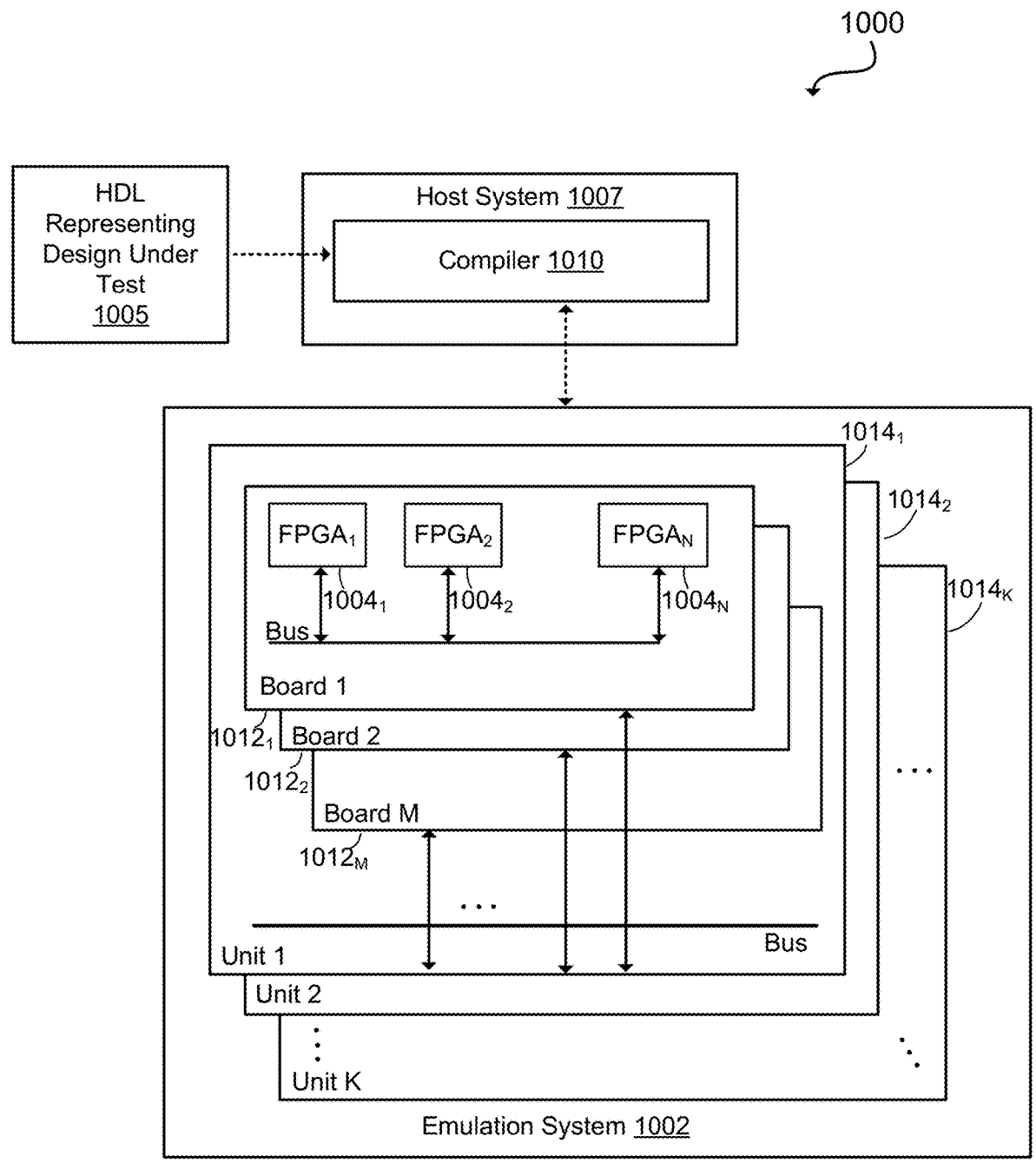
FIG. 10 depicts a diagram of an example emulation system in accordance with some embodiments.

FIG. 10 depicts a diagram of an example emulation environment 1000. An emulation environment 1000 may be configured to verify the functionality of the circuit design. The emulation environment 1000 may include a host system 1007 (e.g., a computer that is part of an EDA system) and an emulation system 1002 (e.g., a set of programmable devices such as Field Programmable Gate Arrays (FPGAs) or processors). The host system generates data and information by using a compiler 1010 to structure the emulation system to emulate a circuit design. A circuit design to be emulated is also referred to as a Design Under Test ('DUT') where data and information from the emulation are used to verify the functionality of the DUT.

The host system 1007 may include one or more processors. In the embodiment where the host system includes multiple processors, the functions described herein as being performed by the host system can be distributed among the multiple processors. The host system 1007 may include a compiler 1010 to transform specifications written in a description language that represents a DUT and to produce data (e.g., binary data) and information that is used to structure the emulation system 1002 to emulate the DUT. The compiler 1010 can transform, change, restructure, add new functions to, and/or control the timing of the DUT.

The host system 1007 and emulation system 1002 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 602.11. The host system 1007 and emulation system 1002 can exchange data and information through a third device such as a network server.

The emulation system 1002 includes multiple FPGAs (or other modules) such as FPGAs $1004_1$ and $1004_2$ as well as additional FPGAs to $1004_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs.

For example, the emulation system 1002 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1004_1$-$1004_N$ may be placed onto one or more boards $1012_1$ and $1012_2$ as well as additional boards through $1012_M$. Multiple boards can be placed into an emulation unit $1014_1$. The boards within an emulation unit can be connected using the backplane of the emulation unit or any other types of connections. In addition, multiple emulation units (e.g., $1014_1$ and $1014_2$ through $1014_K$) can be connected to each other by cables or any other means to form a multi-emulation unit system.

For a DUT that is to be emulated, the host system 1007 transmits one or more bit files to the emulation system 1002. The bit files may specify a description of the DUT and may further specify partitions of the DUT created by the host system 1007 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1007 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1007 and/or the compiler 1010 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1005 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 11:
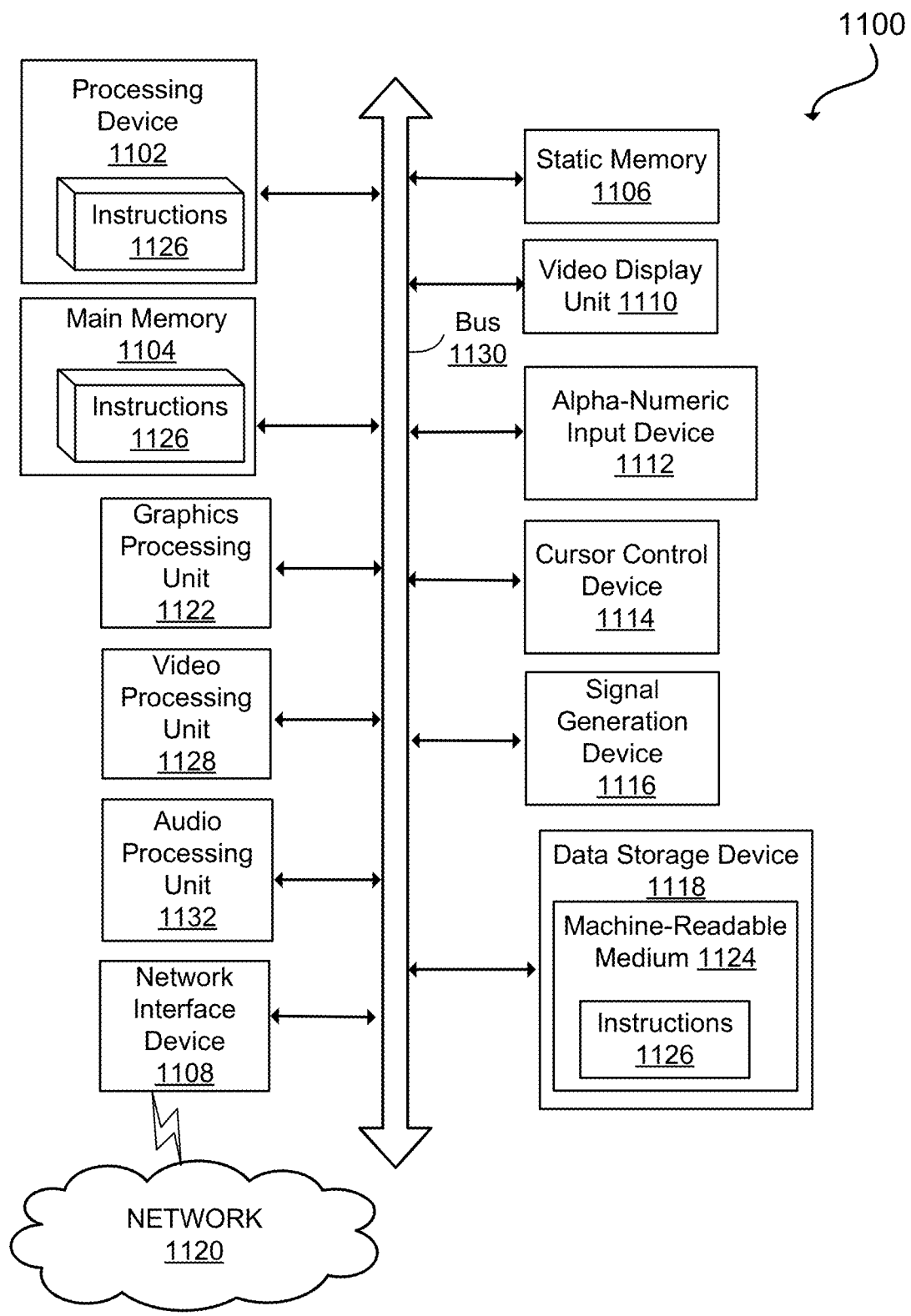
FIG. 11 depicts a diagram of an example computer system in which embodiments may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a netlist comprising a plurality of components and connections between components of a circuit design, wherein the plurality of components comprises (a) a set of assigned components which each has a unique assigned identifier and (b) remaining components outside the set of assigned components, where the remaining components do not have assigned identifiers;
   determining, by a computer system running multiple parallel processes, unique new identifiers for the remaining components, wherein determining the new identifiers comprises;
      visiting the remaining components of the netlist in a topological order starting from the set of assigned components;
      assigning the new identifiers to the visited components, the new identifiers generated based on properties of the visited components and on connections of the visited components with assigned components, wherein assigning the new identifiers is deterministic and the same new identifiers are assigned to the visited components regardless of which of the parallel processes determine the new identifiers for which of the visited components; and
      adding the visited components to the set of assigned components after the visited components are assigned the new identifiers; and
   performing analysis of the circuit design using the unique identifiers assigned to the components.

2. The method of claim 1, wherein the topological order is a reverse topological order.

3. The method of claim 2, further comprising:
   responsive to identifying one or more remaining components that have not been assigned new identifiers after traversal of the reverse topological order, assigning new identifiers to the identified remaining components by performing a direct topological traversal from the set of assigned components.

4. The method of claim 3, further comprising:
   responsive to identifying one or more remaining components that have not been assigned new identifiers after the direct topological traversal, assigning new identifiers to the identified remaining components that have not been assigned new identifiers after the direct topological traversal by performing a second reverse topological traversal starting from the set of assigned components.

5. The method of claim 1, wherein the topological order is a direct topological order.

6. The method of claim 1, further comprising:
   identifying a loop in the netlist, the loop having multiple edges; and
   breaking the loop by eliminating one or more of the edges of the loop.

7. The method of claim 1, wherein the netlist is generated by transformation of a previous netlist, and the unique assigned identifiers for the set of assigned components are retained deterministically from the previous netlist.

8. The method of claim 1, wherein the properties of the visited component include one or more of:
   (1) a type of the visited component,
   (2) a logical operation performed by the visited component, or
   (3) sets of ports of the visited component.

9. The method of claim 1, wherein the new identifier of the visited component is determined using an array hash function that receives as input, for each assigned component connected to the visited component:
   (1) an identifier of the assigned component and
   (2) an identifier of a port of the assigned component that is connected to the visited component.

10. A non-transitory computer readable storage medium comprising stored instructions, which when executed by one or more computer processors, cause the one or more computer processors to:
    receive a netlist comprising a plurality of components and connections between components of a circuit design, wherein the plurality of components comprises (a) a set of assigned components which each has a unique assigned identifier and (b) remaining components outside the set of assigned components, where the remaining components do not have assigned identifiers;
    determine, by the one or more computer processors running multiple parallel processes, unique new identifiers for the remaining components, wherein determining the new identifiers comprises:
       visiting the remaining components of the netlist in a topological order starting from the set of assigned components
       assigning the new identifiers to the visited components, the new identifiers generated based on properties of the visited components and on connections of the visited components with assigned components, wherein assigning the new identifiers is deterministic and the same new identifiers are assigned to the visited components regardless of which of the parallel processes determine the new identifiers for which of the visited components; and
       adding the visited components to the set of assigned components after the visited components are assigned the new identifiers; and
    perform analysis of the circuit design using the unique identifiers assigned to the components.

11. The non-transitory computer readable storage medium of claim 10, wherein the topological order is a reverse topological order.

12. The non-transitory computer readable storage medium of claim 11, wherein the instructions further cause the one or more computer processors to:

responsive to identifying one or more remaining components that have not been assigned new identifiers after traversal of the reverse topological order, assign new identifiers to the identified remaining components by performing a direct topological traversal from the set of assigned components.

13. The non-transitory computer readable storage medium of claim 12, wherein the instructions further cause the one or more computer processors to:
responsive to identifying one or more remaining components that have not been assigned new identifiers after the direct topological traversal, assign new identifiers to the identified remaining components that have not been assigned new identifiers after the direct topological traversal by performing a second reverse topological traversal starting from the set of assigned components.

14. The non-transitory computer readable storage medium of claim 10, wherein the instructions further cause the one or more computer processors to:
identify a loop in the netlist, the loop having multiple edges; and
break the loop by eliminating one or more of the edges of the loop.

15. The non-transitory computer readable storage medium of claim 10, wherein the netlist is generated by transformation of a previous netlist, and the unique assigned identifiers for the set of assigned components are retained deterministically from the previous netlist.

16. The non-transitory computer readable storage medium of claim 10, wherein the properties of the visited component include one or more of:
(1) a type of the visited component,
(2) a logical operation performed by the visited component, or
(3) sets of ports of the visited component.

17. The non-transitory computer readable storage medium of claim 10, wherein the new identifier of the visited component is determined using an array hash function that receives as input, for each assigned component connected to the visited component:
(1) an identifier of the assigned component and
(2) an identifier of a port of the assigned component that is connected to the visited component.

18. A computer system comprising:
one or more computer processors; and
a non-transitory computer readable storage medium comprising stored instructions, which when executed by one or more computer processors, cause the one or more computer processors to:
receive a netlist comprising a plurality of components and connections between components of a circuit design, wherein the plurality of components comprises (a) a set of assigned components which each has a unique assigned identifier and (b) remaining components outside the set of assigned components, where the remaining components do not have assigned identifiers;
determine, by the one or more computer processors running multiple parallel processes, unique new identifiers for the remaining components, wherein determining the new identifiers comprises:
visiting the remaining components of the netlist in a topological order starting from the set of assigned components;
assigning the new identifiers to the visited components, the new identifiers generated based on properties of the visited components and on the connections of the visited components with assigned components, wherein assigning the new identifiers is deterministic and the same new identifiers are assigned to the visited components regardless of which of the parallel processes determine the new identifiers for which of the visited components; and
adding the visited components to the set of assigned components after the visited components are assigned the new identifiers; and
perform analysis of the circuit design using the unique identifiers assigned to the components.

19. The computer system of claim 18, wherein the topological order is a reverse topological order, wherein the instructions further cause the one or more computer processors to:
responsive to identifying one or more remaining components that have not been assigned new identifiers after traversal of the reverse topological order, assign new identifiers to the identified remaining components by performing a direct topological traversal from the set of assigned components.

20. The computer system of claim 19, wherein the instructions further cause the one or more computer processor to:
discard new identifiers assigned to the identified remaining components during the direct topological traversal if the identified remaining component is connected to one or more downstream components; and
assign new identifiers to the identified remaining components with discarded identifiers by performing a second reverse topological traversal from the set of assigned components.

* * * * *